United States Patent [19]
Dennison

[11] 3,723,942
[45] Mar. 27, 1973

[54] GROUNDING CLIP ELECTRIC RECEPTACLES

[75] Inventor: John J. Dennison, Southington, Conn.

[73] Assignee: Arrow-Hart, Inc., Hartford, Conn.

[22] Filed: Mar. 3, 1972

[21] Appl. No.: 231,565

Related U.S. Application Data

[63] Continuation-in-part of Ser. No. 135,034, April 19, 1971, abandoned.

[52] U.S. Cl. ............... 339/14 R, 174/51, 339/133 R
[51] Int. Cl. .............................................. H01r 3/06
[58] Field of Search ....... 174/51, 53; 339/14 R, 14 L, 339/122 R, 132 R, 132 B, 133 R, 134

[56] References Cited

UNITED STATES PATENTS

| | | | |
|---|---|---|---|
| 2,934,590 | 4/1960 | Thompson et al. | 174/53 |
| 3,185,760 | 5/1965 | Despard | 174/51 UX |
| 3,210,458 | 10/1965 | Palmer | 174/51 |
| 3,310,770 | 3/1967 | Ramsing | 339/14 R |
| 3,403,214 | 9/1968 | Slater | 174/53 |
| 3,403,215 | 9/1968 | Slater et al. | 174/53 |
| 3,432,793 | 3/1969 | Muska et al. | 339/14 R |
| 3,609,213 | 9/1971 | Winter et al. | 174/51 |
| 3,639,884 | 2/1972 | Drapkin | 339/14 R |
| 3,663,919 | 5/1972 | Jaconette | 339/14 R |
| 3,671,916 | 6/1972 | Opalenik | 339/14 R |

Primary Examiner—Laramie E. Askin
Attorney—W. F. Sonnekalb, Jr.

[57] ABSTRACT

A bent leaf-spring type clip member is secured to the mounting bridge or the grounded contact terminal of an electric receptacle or connector and bent up around one end of the bridge or body of the device in position to press constantly against the shank of the mounting screw as it passes through an aperture in the plaster ear portion of the bridge member or mounting flange of the device and through an aperture in the clip. The screw threads into the usual lug on the outlet or wall box or mounting plate to secure the device in position.

14 Claims, 7 Drawing Figures

PATENTED MAR 27 1973 3,723,942

PATENTED MAR 27 1973 3,723,942

GROUNDING CLIP ELECTRIC RECEPTACLES

This application is a continuation-in-part of copending application, Ser. No. 135,034, filed Apr. 19, 1971, now abandoned.

This invention relates to electric wiring devices commonly known as attachment plug receptacles and outlets. They are designed to receive electric connecting devices known as attachment plug caps to tap off current for numerous kinds of electric appliances, tools and devices.

More particularly, the invention relates to grounded type attachment plug receptacles and outlets (herein referred to generically as receptacles) of the kind having three holes and three contacts, one of which is a ground-connected contact. Such receptacles are now common and are required by electrical codes as standard equipment in many localities.

Heretofore such receptacles were provided with a grounded contact mounted on a bridge member that supported the receptacle body in position across the open front of an outlet or wall box (herein generically referred to as the metal box). A ground wire terminal was also provided connected with or mounted upon the supporting bridge, so that a wire connection could be made by the installer from the ground terminal to ground. These connections were often forgotten or not made by the installer. Hence, in such instances the only ground connection was from the ground contact through the bridge member and to the metal box by way of the screws which secure the bridge to the box. However, these screw connections were unreliable. Occasionally the mounting screw badly engaged the box or the mounting bridge or both and made poor contact with one or the other of them. The result was a high resistance path from the ground contact to ground and an improper grounding connection existed.

Many attempts have been made to overcome these problems and difficulties and to improve the connections to ground, some of which have provided good results but at a relatively high cost, while others have produced mediocre results or have produced problems of their own or failed to work in every situation and environment.

According to this invention a bent leaf-spring-type clip member is secured to the mounting bridge and bent up around one end thereof in position to press constantly against the shank of the mounting screw as it passes through the usual aperture in the plaster ear portion of the bridge member and through an aperture in the clip. The screw threads into the usual lug on the outlet or wall box to secure the receptacle on the box.

According to another adaptation of the invention in which the receptacle or connector has no separate mounting bridge but has a flange of insulation integral with the insulating body, a bent leaf spring clip is connected at one end to a ground contact of the receptacle while its opposite end adjacent the mounting screw presses constantly toward the shank of the screw to perform the same function as in the first mentioned form.

Thus, it is an object of this invention to provide wall box a leaf-spring-type clip which can be inexpensively stamped from sheet metal and easily and inexpensively mounted on the receptacle to provide a reliable ground connection from the bridge to the mounting screw and the wall box or outlet box.

Another object of the invention is to provide a leaf-spring-type clip which can be inexpensively stamped from sheet metal and easily and inexpensively mounted on a strapless or bridgeless type of receptacle having an integral mounting flange of insulation material, to provide a reliable ground connection from a grounded mounting plate to the ground contact of the receptacle.

Other objects and advantages of the invention will appear as it is described in connection with the accompanying drawings.

Figure 1:
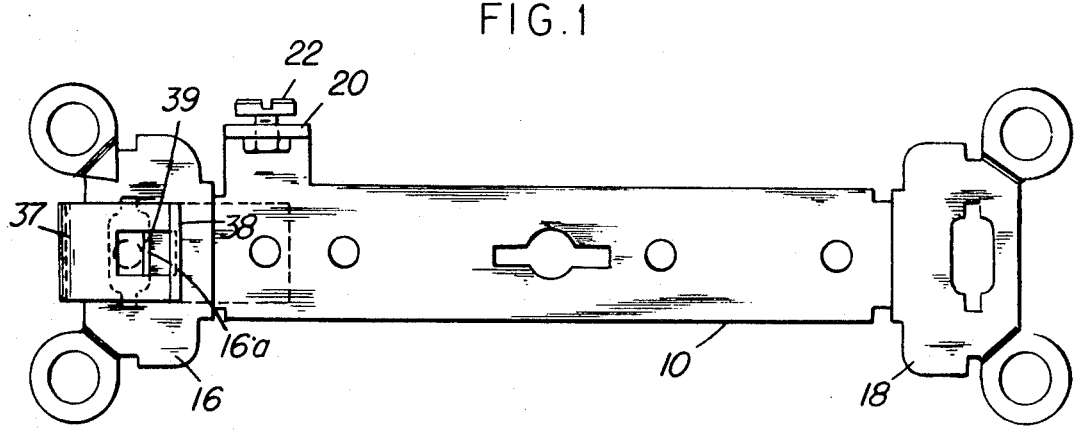
FIG. 1 is a plan view of the mounting bridge for an attachment plug receptacle in which the invention is embodied.
Figure 2:
FIG. 2 is a side elevational view of the mounting bridge with the body of the receptacle partly broken away.
Figure 3:
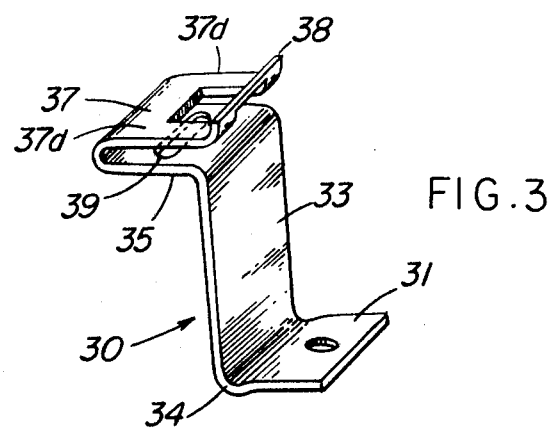
FIG. 3 is a perspective view of the grounding clip member.

Referring to the form of the invention shown in FIGS. 1 – 4 of the drawing, a conventional U-shaped stamped sheet metal mounting bridge for an insulating body 15 of an attachment plug receptacle has a central transverse portion 10, the ends 12 and 14 of which bend up perpendicularly parallel to each other. The extremities of the bent-up ends are bent outwardly in opposite directions to form plaster ears 16 and 18. On one edge of the central part near one end, a ground terminal lug 20 is bent up and pierced and tapped for reception of a terminal screw 22 for connection of a ground wire. Commonly, a U-shaped ground contact 17 with substantially parallel contact fingers extending up from the transverse portion 10 is mounted on the transverse portion of the bridge by a rivet and extends up through the insulating body to a slot or hole in the body, through which the ground prong of a plug may have access to the ground contact 17.

To ensure connection to ground automatically when the receptacle is mounted in the box, in case the installer fails to make the connection from the ground terminal to ground, a ground clip 30 is provided which may be riveted or spot welded to the central portion of the bridge member or connected thereto in any other manner which will provide a low resistance connection which is secure and firm. The clip is preferably stamped as a strip from thin sheet metal of good electrical conductivity and is bent into generally Z-shape with a reversely bent end, as will now be described. One end 31 of the clip member is placed under the central part 10 of the bridge at one end and riveted thereto. The mid-part 33 of the clip is bent up alongside the bent-up end 12 of the mounting bridge. The clip is then bent outwardly at the upper end of the mid-part 33, as at 35, under and parallel to the plaster ear 16, and then is reversely bent around the end of and over the ear as at 37. The over-ear part 37 is divided so that the divisions 37d extend alongside an aperture, such as is commonly provided in the plaster ear for passage of a securing screw. Preferably, the divisions are joined at their extremities by a manually engageable upturned lip 38 to permit the clip member to be flexed momentarily for the purpose described below. Preferably, the plaster ear aperture 16a is shaped as shown most clearly in the ear 18 or is of generally oblong shape with a width larger than the diameter of the conventional securing screw 40 that is to pass through it into the usual tapped lug 42 of the wall or outlet box. The bridge may thus be secured by the screw to the box.

In the under-ear part 35 of the clip is an aperture 39 through which the end of the securing screw may pass to the box lug 42. The mounting part 33 of the clip is inclined slightly away from the end 12 of the bridge; and the aperture 39 of the clip is not fully in register with the aperture 16a in the plaster ear. As a result, when the installer starts to secure the receptacle on the box, he inserts the securing screw 40 through the aperture 16a of the plaster ear and then through the aperture 39 in the under-ear part 35 of the clip. Due to the slight offset of the aperture 39 from the aperture 16a, the edge of the clip aperture 39 will engage and tend to bite into the customary brass securing screw. This engagement is maintained with a constant pressure by the resilience of the clip and by the inclination of the mid-part 33 of the clip from the bridge end 12 and toward the screw. To facilitate the insertion of the screw through the clip aperture 39, the lip 38 may be manually engaged to flex the clip out of the path of the screw while it is being inserted.

Constant pressure is exerted against the screw by the clip in assembled condition, ensuring a good low resistance electrical path from the highly conductive screw through the highly conductive lip to the riveted lower end of the clip where it is secured to the bridge. Thus, the riveting of the clip to the bridge ensures a permanent, easily assembled, low resistance electrical connection to the screw and the grounded box.

Preferably the biasing action of the mid-portion 33 is toward the bridge end 12, causing the outer edge of the clip aperture 39 to engage the shank of the screw on the side away from the receptacle body. If any foreign material such as dirt, plaster or bits of wire fall between the mid-portion 33 and the bridge end 12 overcoming the bias, then the opposite side of the clip aperture 39 will engage the side of the screw that is nearer to the bridge end 12. On the other hand, if foreign matter should fall between the box wall and the mid-portion 33 of the clip, any pressure it exerts will simply enhance the normal bias of the clip.

Preferably, a transverse rib 34 is formed in the foot of the clip member adjacent the joint between the foot and the mid-portion 33, in order that the clip may accommodate to variations between the length of the mid-portion 33 and the end 12 of the bridge member, without depending entirely on its flexibility.

The reversely bent upper end of the clip enables it to be engaged with the plaster ear of the mounting bridge during assembly, so as to be held in position temporarily to facilitate the riveting of the clip to the bridge. It also tends to hold the clip in place during handling and shipment.

Although in the preferred form the aperture 39 is in the portion 35 of the clip under the plaster ear, the aperture may also be formed of similar shape and for like function in the over-ear part 37.

Figure 4:
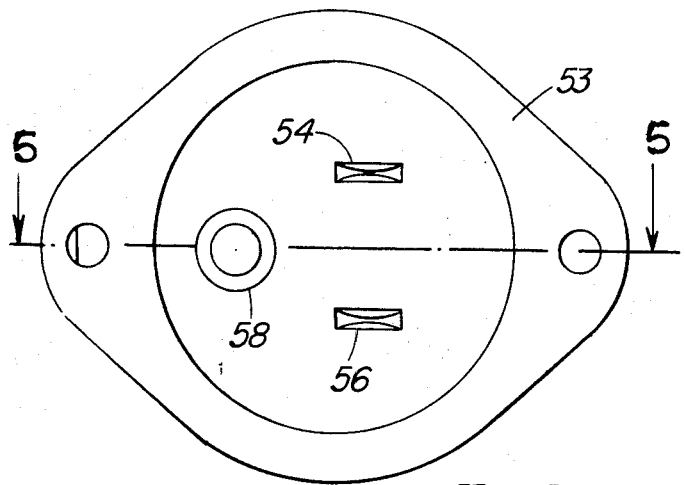
FIG. 4 is a top plan view of the invention applied to an all-insulation form of male electric receptacle.
Figure 5:
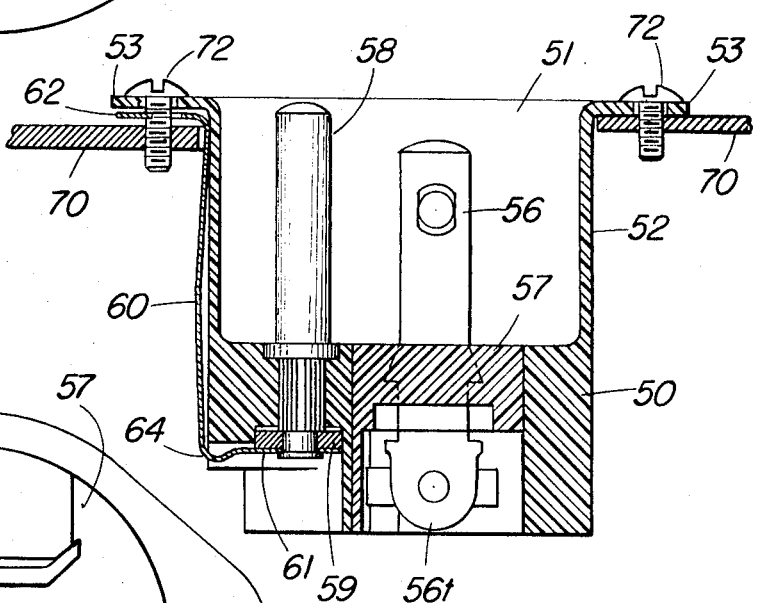
FIG. 5 is a sectional view along line 5—5 of FIG. 4.
Figure 7:
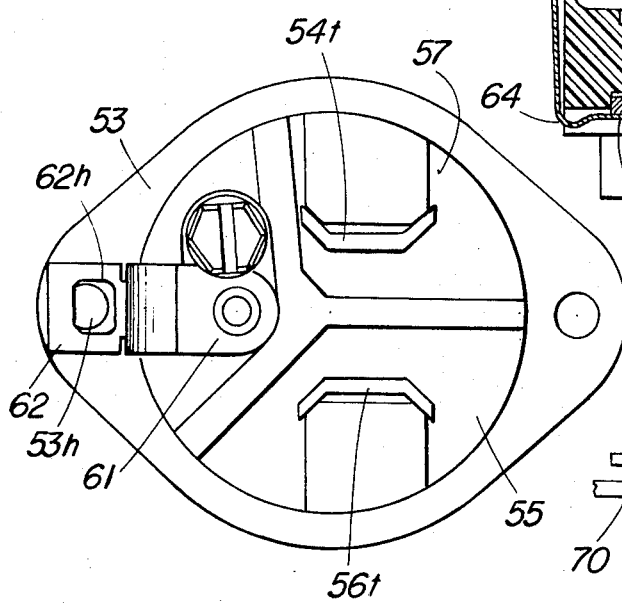
FIG. 7 is a bottom view of the form of invention of FIGS. 4 to 6.
Figure 6:
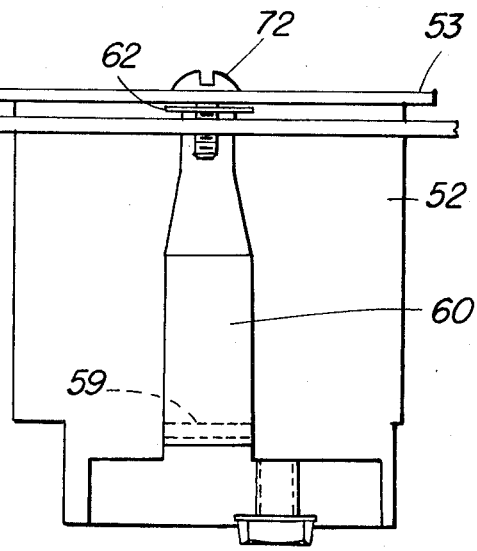
FIG. 6 is a side elevational view of the form of the invention as shown in FIGS. 4 and 5.

In the form of the invention illustrated in FIGS. 4 to 6, the body of the receptacle is made of molded insulating material having a cylindrical recess 51 defined by a cylindrical wall 52 with an outwardly extending flange 53 at its top and closed by a wall or floor at its bottom. The receptacle may be mounted in a grounded metal plate 70 or any other grounded supporting member having a hole to receive the body 50 with the flange 53 lying on top of the plate or member 70, and may be fastened in place by screws 72 extending through a hole in the flange and threading into tapped holes in the mounting plate. Although the flange is illustrated as extending entirely around the body, it need not do so. It may only extend out at opposite sides of the body so as to rest on the surface of the metal plate 70 at opposite sides of the hole in which the body 50 resides.

Within the recess 51 are two prong contacts 54,56 extending in parallel relationship up from the floor of the recess. If desired, these prong contacts 54 and 56 may be molded into inserts 55 and 57 fitted in and secured in the bottom of the body 50 with terminal portions 54t and 56t of the contacts extending through to the opposite side of the receptacle body. Also within the recess and extending up from the floor is a grounding contact 58 whose inner end extends down through the floor or bottom of the receptacle body and through a terminal plate 59.

To ensure connection to ground automatically when the receptacle is mounted on the plate 70, a ground clip 60 is provided. The clip is preferably stamped from thin sheet metal of good electrical conductivity in strip form and is bent in Z-shape, with one end 61 underlying the terminal plate 59. For securing the end 61 against the plate 59 the diameter of the end of the ground contact 58 is reduced and extends through the terminal plate and through an aperture in the end 61. The reduced end is then peened over onto the end 61. In this way, the ground contact 58, terminal plate 59 and clip end 61 are permanently assembled on the body 50 of the receptacle.

The mid-portion of the clip 60 extends up along the outside surface of the receptacle body to the flange 53 and its end 62 is then bent outwardly under the flange in position to overlie the mounting plate when the receptacle is mounted on the mounting plate 70. To permit passage of the mounting screw 72, hole 62h is formed in the outwardly extending end 62 of the clip.

As in the previously described form of the invention, the clip is preferably bent and biased toward the wall of the receptacle so that the hole 62h in the end 62 is not in full register with the hole 53h in the flange 53. The bias of the clip thus tends to cause the edge of the hole 62h to engage or bite into the shank of the securing screw 72.

As in the previously described form, the mid-portion of the clip 60 and its lower end 61 are joined by a transverse rib 64 or bowed portion to accommodate variations in dimensions of the respective parts.

The form of the invention shown in FIGS. 4 to 7 is applicable to a flange-mounted type of receptacle which has female type contacts with gripping fingers which receive the prongs of a plug, instead of the male type illustrated in FIGS. 4 to 7. In the case of the female type contacts, the contacts are located in recesses or a recess in the insulating body in a manner similar to the conventional duplex receptacle illustrated in FIG. 2.

Thus even if the installer fails to tighten the screw fully so as to grip the end 62 between the flange 53 and the grounded plate 70 to provide a good permanent ground, the engagement of the screw shank by the edge of the hole in the end 62 will do so.

By this invention, wire clips which are difficult to handle and relatively expensive to make and to assemble are avoided, and may be replaced by an easily fabricated and assembled sheet metal part for the ground connection.

Many modification within the scope of the invention will appear to those skilled in the art. Therefore, the invention is not limited to the exact form and dimensions of the parts as illustrated and described.

What is claimed is:

1. An electric wiring device comprising a metal supporting bridge, an insulating body supported on said bridge, a plurality of electric contacts within said body at least one of which is a grounding contact, said bridge having ends for extending across the edges of a grounded wall box, said ends having holes for passage of securing screws for attachment of said bridge to said box, and a separate stamped sheet metal grounding clip member affixed at one end to said bridge and having an edge portion near its opposite end positioned to engage one of said screws, said clip member being resilient and biased in a direction to cause said edge portion constantly to engage said one screw to establish a ground connection from said box through said screw and clip member to said bridge.

2. A device as claimed in claim 1 wherein said bridge is U-shaped and said clip member is Z-shaped.

3. A device as claimed in claim 1 wherein said bridge has a central portion and portions upturned with respect to said central portion at its ends, and plaster ears out-turned from said upturned portions, and wherein said clip member is Z-shaped with one end affixed to said central bridge portion, the central portion of the Z member extending alongside an upturned portion of said bridge and the other end portion of said Z member extending alongside one of the ears of said bridge.

4. A device as claimed in claim 3 in which said clip member has a rib adjacent the joint between said affixed end and said central portion for self-adjustment to variations in the length of the upturned portions of the bridge.

5. In an electric wiring device supported by an electrically conductive bridge member for extending across the front of a grounded metal box, the means to establish a low resistance electrical ground connection between said box and bridge member, comprising a stamped resilient sheet metal clip member secured at one end with a low-resistance electrical connection to said bridge member, an aperture in said clip member near its opposite end of greater width than the diameter of a standard mounting screw used for securing said bridge member to said box, said clip member being biased in a direction to press one edge of said aperture constantly against said screw when said screw is inserted through a hole near the end of said bridge member and screwed into a tapped hole in said box.

6. A device as claimed in claim 5 having a manually engageable lip on said clip member for flexing said clip member against its bias to facilitate insertion of said screw through said hole in said clip member.

7. A device as claimed in claim 6 wherein said bridge member is U-shaped and said clip member is Z-shaped.

8. A device as claimed in claim 7 in which said clip member has a rib adjacent the joint between its mid-part and said secured end for self-adjustment to variations in the length of the upturned portions of the bridge member.

9. A device as claimed in claim 5 wherein said bridge member is U-shaped and said clip member is Z-shaped.

10. A device as claimed in claim 9 in which said clip member has a rib adjacent the joint between its mid-part and said secured end for self-adjustment to variations in the length of the upturned portions of the bridge.

11. An electrical connector having an insulation body,
   a plurality of contact members one of which is a ground contact member mounted within said body and adapted to be engaged by a mating connector member having a like number of contact members,
   means on said connector supporting said first connector member across an opening in a grounded electrically conductive support member,
   a grounding clip member for electrically connecting said ground contact member to said grounded support,
   means electrically connecting said ground contact member at one end to said clip member and fixedly securing said clip member relative to said insulation body, said clip member being formed of a strip of resilient metal and having an out-turned end having an edge adjacent to and permitting passage of a screw shank passing to a tapped hole in said grounded support member, said edge being urged constantly by said resilient member toward engagement with said screw shank.

12. A device as claimed in claim 11 wherein said clip member is Z-shaped.

13. A device as claimed in claim 12 in which said clip member has a rib adjacent the joint between said one end and the mid-portion of the clip for self-adjustment to variations in dimensions.

14. A device as claimed in claim 11 in which said means for supporting the first connector is an out-turned flange on said insulation body extending outwardly at least at opposite sides of the body.

* * * * *